(12) United States Patent
Urso

(10) Patent No.: US 10,988,623 B2
(45) Date of Patent: Apr. 27, 2021

(54) GLOSS REMOVABLE COATING

(71) Applicant: The Sherwin-Williams Company, Cleveland, OH (US)

(72) Inventor: Rebecca A. Urso, Warrensville Hts., OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 16/941,696

(22) Filed: Jul. 29, 2020

(65) Prior Publication Data
US 2020/0354586 A1 Nov. 12, 2020

Related U.S. Application Data

(63) Continuation of application No. 15/860,228, filed on Jan. 2, 2018, now Pat. No. 10,745,566.

(60) Provisional application No. 62/441,206, filed on Dec. 31, 2016.

(51) Int. Cl.
| | | |
|---|---|---|
| *C09D 125/06* | (2006.01) | |
| *C09D 125/08* | (2006.01) | |
| *C08K 3/34* | (2006.01) | |
| *C09D 5/00* | (2006.01) | |
| *C09D 153/02* | (2006.01) | |
| *C09D 7/61* | (2018.01) | |

(52) U.S. Cl.
CPC ............ *C09D 5/008* (2013.01); *C09D 7/61* (2018.01); *C09D 125/06* (2013.01); *C09D 125/08* (2013.01); *C09D 153/025* (2013.01); *C08K 3/34* (2013.01)

(58) Field of Classification Search
CPC .... C09D 5/008; C09D 125/06; C09D 125/08; C08K 3/34
USPC .......................................................... 524/450
See application file for complete search history.

(56) References Cited

U.S. PATENT DOCUMENTS

2008/0011190 A1* 1/2008 Remortel .................. C08K 3/34
106/31.13

* cited by examiner

*Primary Examiner* — Kelechi C Egwim
(74) *Attorney, Agent, or Firm* — Hahn Loeser & Parks LLP; John J. Cunniff

(57) ABSTRACT

A coating composition comprises at least one solvent, at least one resin, and at least one filler, wherein the filler is silica-deficient, sodium-potassium alumina silicate. The silica-deficient filler may be a sodium-potassium alumina silicate that contains less than 0.1 percent by weight crystalline silica and is 5 percent by weight or less of the coating composition or 1 percent by weight or less of the coating composition. In the later instance, the coating composition contains less than 0.001 percent crystalline silica. The resin may comprise styrene, styrenic copolymers, or mixtures including styrene. The composition provides a temporary gloss coating that may be removed physically, as by peeling for example. A method for coating a substrate with a coating that maybe removed by physical means is also provided. The method comprises applying the disclosed coating composition.

20 Claims, 1 Drawing Sheet

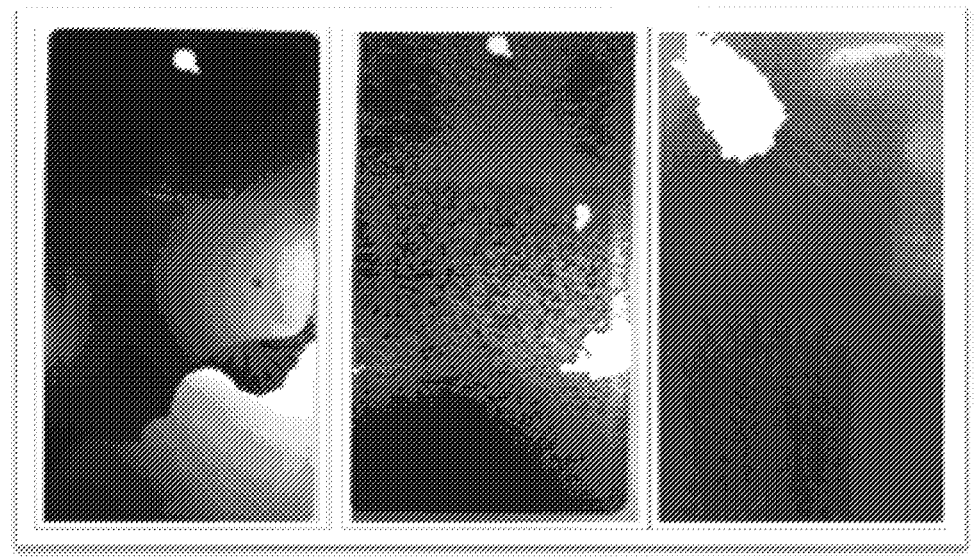
Inventive Gloss Black Coating     Prior Art Coating 1     Prior Art Coating 2

GLOSS REMOVABLE COATING

CROSS REFERENCE TO RELATED APPLICATIONS

This application is a continuation application of U.S. application Ser. No. 15/860,228, filed Jan. 2, 2018, which claims benefit of U.S. Provisional Application No. 62/441,206, filed on Dec. 31, 2016. The disclosures of the above-referenced applications are incorporated herein by reference.

BACKGROUND OF THE INVENTION

This invention relates to removable coating formulations. More particularly, this invention relates to a gloss removable coating formulation. Even more particularly, this invention relates to gloss removable coating formulations for automotive finishes.

The use of temporary coatings, particularly in connection with automotive finishes, is well known. Temporary coatings may be used, for example, in protecting a finish of an automobile during transport or to add accents or stylization such as so-called "pinstripes," "racing stripes," tire markings or other accents or stylization to an automobile. While such markings may be added on a permanent basis, it is sometimes desirable to use a temporary coating, such as one that may be removed by peeling for example. If the marking is temporary, it may be removed as the need or desire for the marking changes, or if an error is made in application of the coating.

It is also known that some temporary coatings may degrade over time, with exposure to sunlight for example. That degradation may take the form of an impaired ability to remove the coating when desired for example. It is also recognized that temporary coatings are typically offered in a "matte," or low gloss, finish. When a high gloss finish is desired, it requires the separate application of a high gloss transparent top coat.

There is a need therefore, for an alternative temporary coating formulation, that optionally provides resistance to ultraviolet (UV) light. There is also a need for an alternative temporary coating formulation that provides a gloss finish in a single formulation.

SUMMARY OF INVENTION

It is, therefore, an aspect of the present invention to provide an alternative temporary coating formulation.

It is another aspect of the present invention to provide an alternative temporary coating formulation that is resistant to UV exposure.

It is still another aspect of the present invention to provide an alternative temporary coating formulation that provides a gloss finish.

In general, the present invention provides a coating composition comprising: at least one solvent, at least one resin, and at least one filler, where the filler is a silica-deficient filler. In one example, the silica-deficient filler is silica-deficient, sodium-potassium alumina silicate. In another example, the silica-deficient filler contains less than 0.1 percent crystalline silica. In addition or in the alternative, the coating provides a gloss finish and/or is removable without scraping after 1000 hours of QUV testing. The present invention also provides a method of temporarily coating a substrate, the method comprising applying a coating composition containing a silica-deficient filler to the coating, where the coating provides a gloss finish and/or is removable without scraping after 1000 hours of exposure to UV light.

BRIEF DESCRIPTION OF THE DRAWING

FIG. 1 is a set of three photographs of the temporary coating of the present invention and two prior art coatings after 1000 hours of QUV testing as a simulation of exposure to the elements.

DETAILED DESCRIPTION OF THE INVENTION

The present invention is directed toward an alternative temporary coating formulation. The formulation may provide UV resistance. In addition or in the alternative, the coating may provide a gloss finish when dry.

In one embodiment, the composition contains a silica deficient, sodium-potassium alumina silicate, nepheline syenite. In another embodiment, the composition contains a sodium-potassium alumina silicate containing less than 0.1 percent crystalline silica. In addition or in the alternative, the filler may be present in the coating at a level of less than 5 percent, less than 4 percent, less than 3 percent, less than 2 percent or even 1 percent or less. In one particular example, the filler is present at a concentration of approximately 1 percent, yielding a crystalline silica content of less than 0.001 percent in the coating composition. One particular filler that may be used in the present invention is MINEX® 12, available from Unimin Canada Ltd. (Toronto, Canada). MINEX® 12 is a nepheline syenite believed to have the following composition (in percentages by weight): $SiO_2$—60.2 percent, $Al_2O_3$—23.60 percent, $Na_2O$ 10.5 percent, $K_2O$—4.8 percent, CaO—0.35 percent, $Fe_2O_3$—0.08 percent, and MgO—0.02 percent. It has a median particle size of 1.5 microns (1.5 µm).

In some embodiments, the solvent may be selected from hydrocarbon solvents such as mineral spirits, xylene, parachlorobezotrifluoride, glycol ether PNB, and similar compounds and mixtures thereof. One or more solvents may be present at a concentration of 40-60 percent by weight, for example. In one particular example, one or more solvents may be present at a concentration of 45-55 percent by weight.

In some embodiments, the resin may be a hydrocarbon resin such as polypropylene, polystyrene and copolymers, mixtures and derivatives thereof and the like. In some examples, the resin comprises styrene, styrenic copolymers, or mixtures including styrene. In one particular example the resin may be selected from one or more of Kraton® G 1652 (Kraton Polymers US LLC, Houston, Tex.), Kraton® G 1653 (Kraton Polymers US LLC, Houston, Tex.) or Piccolastic® A75 (Eastman Chemical Co., Kingsport Tenn.). Kraton® G 1652 and Kraton® G 1653 are styrene-ethylene-butylene styrene (SEBS) linear block copolymers with a polystyrene content of about 30 percent. Kraton® G 1653 was previously designated Kraton® MD 1653/XPH200 by the manufacturer and differs from Kraton® G 1652 by having a lower molecular weight and solution viscosity than Kraton® G 1652. Dissolved 25% in toluene at 25° C., Kraton® G 1652 has a solution viscosity of 1800 cP while Kraton® G 1653 has a viscosity of 480 cP. Piccolastic A75 is a styrene monomer with a weight average molecular weight ($M_w$) of 1300, a number average molecular weight ($M_n$) of 700, and $M_w/M_n$ ratio of 1.9. In one example, the resin comprises between 15 and 20 percent styrene-ethylene-butylene styrene copolymer and between 2 and 3 percent styrene. In another example, the resin comprises 16 percent styrene-ethylene-butylene styrene copolymer and 2.8 percent styrene.

Pigments may also be used as they commonly are in the coatings industry, at a level appropriate for the desired color of the final product. Example include carbon black, titanium dioxide, Naphthol AS and similar pigments.

Additional components may optionally be present such as UV absorbers, such as Thasorb® UV-328 (Rianlon Corp., Tiajin, China), and antioxidants, such as butylated hydrotoluene (BHT), to provide their known properties to the final composition. The use of components such as defoaming agents, like BYK-052 N (Byk-Chemie GmbH, Wessel, Germany) for example, are also known in the coatings industry and may be used here to assist in the manufacture of the coating composition without harming the properties of the final product.

The invention will be better understood by reference to the following examples which are included for the purpose of illustration and not limitation. One example of the composition was made with the components listed in Table 1 to provide a gloss black coating formulation.

TABLE 1

| Component | Weight % |
|---|---|
| Mineral Spirits | 42.2040% |
| Xylene | 5.5000% |
| Parachlorobenzotrifluoride | 15.0000% |
| BYK-052 N | 1.0000% |
| Glycol Ether PNB | 1.9000% |
| KRATON ® G 1653 | 16.0000% |
| PICCOLASTIC ® A75 | 2.8000% |
| THASORB ® 328 U-V Absorber | 0.8000% |
| RAVEN 1020 Powder Carbon Black | 1.0000% |
| MINEX ® 12 Nepheline Syenite | 1.0000% |
| Parachlorobenzotrifluoride | 12.2960% |
| Butylated Hydroxy Toluene | 0.5000% |

The resulting composition was then charged with cyclohexane and propane as indicated in Table 2, to provide a temporary coating formulation as a black aerosol paint.

TABLE 2

| Component | Weight percent |
|---|---|
| Gloss Black Removable Coating | 60.0000% |
| Cyclohexane | 15.0000% |
| Propane | 25.0000% |

In another example, a white gloss temporary coating formulation was synthesized with the following components listed below in Table 3.

TABLE 3

| Component | Weight % |
|---|---|
| Mineral Spirits | 42.2040% |
| Xylene | 5.5000% |
| Parachlorobenzotrifluoride | 15.0000% |
| BYK ®-052 N | 1.0000% |
| Glycol Ether PNB | 1.9000% |
| KRATON ® G 1653 | 16.0000% |
| PICCOLASTIC ® A75 | 2.8000% |
| THASORB ® 328 U-V Absorber | 0.8000% |
| KRONOS 2300 | 2.5000% |
| MINEX ® 12 Nepheline Syenite | 1.0000% |

TABLE 3-continued

| Component | Weight % |
|---|---|
| Parachlorobenzotrifluoride | 10.7960% |
| Butylated Hydroxy Toluene | 0.5000% |

The resulting composition was then charged with cyclohexane and propane as indicated in Table 4 to provide a temporary coating formulation as a white aerosol paint.

TABLE 4

| Component | Weight percent |
|---|---|
| Gloss White Removable Coating | 60.0000% |
| Cyclohexane | 15.0000% |
| Propane | 25.0000% |

In still another example, a red gloss temporary coating formulation was synthesized with the components listed in Table 5.

TABLE 5

| Component | Weight % |
|---|---|
| Mineral Spirits | 42.2040% |
| Xylene | 5.5000% |
| Parachlorobenzotrifluoride | 15.0000% |
| BYK ®-052 N | 1.0000% |
| Glycol Ether PNB | 1.9000% |
| KRATON ® G 1653 | 16.0000% |
| PICCOLASTIC ® A75 | 2.8000% |
| THASORB ® 328 U-V Absorber | 0.8000% |
| AKAHUE RED F3RK PR170 | 1.0000% |
| KRONOS 2300 | 0.2000% |
| MINEX ® 12 Nepheline Syenite | 1.0000% |
| Parachlorobenzotrifluoride | 12.0960% |
| Butylated Hydroxy Toluene | 0.5000% |

The resulting composition was then charged with cyclohexane and propane as in Table 6 to provide a temporary coating formulation as a red aerosol paint.

TABLE 6

| Component | Weight percent |
|---|---|
| Gloss Red Removable Coating | 60.0000% |
| Cyclohexane | 15.0000% |
| Propane | 25.0000% |

In another example, a blue gloss temporary coating formulation was synthesized using the components indicated in Table 7.

TABLE 7

| Component | Weight % |
|---|---|
| Mineral Spirits | 42.204% |
| Xylene | 5.5000% |
| Parachlorobenzotrifluoride | 15.0000% |
| BYK ®-052 N | 1.0000% |
| Glycol Ether PNB | 1.9000% |
| KRATON ® G 1653 | 16.0000% |
| PICCOLASTIC ® A75 | 2.8000% |
| THASORB ® 328 U-V Absorber | 0.8000% |
| Raven 1020 Powder Carbon Black | 1.0000% |
| MINEX ® 12 Nepheline Syenite | 1.0000% |
| Parachlorobenzotrifluoride | 12.2960% |
| Butylated Hydroxy Toluene | 0.5000% |

The resulting blue gloss composition was then charged with cyclohexane and propane as provided in Table 8 to provide a temporary coating formulation as a blue aerosol paint.

TABLE 8

| Component | Weight percent |
|---|---|
| Gloss Blue Removable Coating | 60.0000% |
| Cyclohexane | 15.0000% |
| Propane | 25.0000% |

For comparison purposes, a black matte temporary coating formulation was synthesized using the components and amounts listed in Table 9.

TABLE 9

| Composition | Weight % |
|---|---|
| Mineral Spirits | 36.3734% |
| Xylene | 5.5221% |
| Parachlorobenzotrifluoride | 15.0602% |
| BYK ®-052 N | 1.0040% |
| Glycol Ether PNB | 1.9076% |
| KRATON ® G 1653 | 16.0643% |
| PICCOLASTIC ® A75 | 2.8112% |
| THASORB ® 328 U-V Absorber | 0.8032% |
| RAVEN 1255 Powder | 1.6064% |
| Parachlorobenzotrifluoride | 10.8394% |
| ARBOCEL UFC 100 | 1.0040% |
| PROPYLTEX 325S | 0.5020% |
| Butylated Hydroxy Toluene | 0.5020% |

The resulting black matte composition was then charged with cyclohexane and propane as indicated in Table 10 to provide a temporary coating formulation as a black aerosol paint.

TABLE 10

| Component | Weight percent |
|---|---|
| Black Matte Removable Coating | 60.0000% |
| Cyclohexane | 15.0000% |
| Propane | 25.0000% |

The gloss of each of the above referenced gloss coatings was compared to corresponding colors of prior matte finish coatings. The gloss of the coatings was measured by measuring the reflectance of light off each coating at 60°. Results are provided in Table 11.

TABLE 11

| Coating Color | Matte Finish: Gloss Reading at 60° | Gloss Finish: Gloss Reading at 60° |
|---|---|---|
| Black | 10 | 35 |
| Red | 9 | 30 |
| White | 8 | 60 |
| Blue | 7 | 45 |

The inventive coatings and two commercially available prior art gloss temporary coatings were applied to flat aluminum substrates and the initial gloss of each coating was determined by measuring reflectance of light at 60°. The samples were then exposed to simulated weathering conditions (QUV testing), exposing the coated substrates to alternating cycles of UV light and moisture at controlled, elevated temperatures. The samples were illuminated under UVA-340 lamps to approximate natural sunlight, and to condensation to simulate dew and rain under the following conditions:

Irradiance: 0.77 $W/m^2/nm$

UV cycle: 4 hours at 60° C.+/−3° C.

Condensation cycle: 4 hours at 50° C.+/−3° C.

At the conclusion of 1000 hours of QUV testing, the gloss and general condition of the coating was examined. The results are provided in Table 12 below.

TABLE 12

| Product | Initial Gloss | Gloss after 1000 hours QUV | Description of coating after 1000 hours QUV |
|---|---|---|---|
| Black Gloss | 24 | 37 | mild fading |
| Red Gloss | 26 | 53 | mild fading |
| White Gloss | 30 | 12 | yellowing |
| Blue Gloss | 49 | 29 | mild fading |
| Prior Art Black Gloss 1 | 46 | 3 | fading cracking, not a coating |
| Prior Art Black Gloss 2 | 85 | 33 | fading, brittle film |

The ability of the temporary coating to be peeled from the substrate was also tested after 1000 hours QUV testing. Each of the coatings according to the present invention could be peeled from the substrate without scraping although not as a complete sheet. The prior art coatings could not be peeled from the substrate without scraping and exhibited high adhesion to the substrate.

Based upon the foregoing disclosure, it should now be apparent that the present invention is highly effective in providing a temporary coating that possesses advantageous properties over those of previously known compositions. It is, therefore, to be understood that any variations evident fall within the scope of the claimed invention and thus, the selection of specific component elements can be determined without departing from the spirit of the invention herein disclosed and described.

I claim:

1. A coating composition comprising: at least one hydrocarbon solvent, at least one resin, and at least one filler, wherein the filler is silica-deficient and wherein the resin comprises styrene-ethylene-butylene styrene copolymer and styrene, and wherein the composition, when applied to a substrate and allowed to dry, produces a coating which can be removed from the substrate by physical means only.

2. The coating composition of claim 1, wherein the silica-deficient filler is a sodium-potassium alumina silicate that contains less than 0.1 percent by weight crystalline silica.

3. The coating composition of claim 2, wherein the silica-deficient, sodium-potassium alumina silicate comprises 5 percent by weight or less of the coating composition.

4. The coating composition of claim 3, wherein the silica-deficient, sodium-potassium alumina silicate comprises 1 percent by weight or less of the coating composition, and the coating composition contains less than 0.001 percent crystalline silica.

5. The coating composition of claim 4, wherein the resin comprises between 15 and 20 percent styrene-ethylene-butylene styrene copolymer.

6. The coating composition of claim 5, wherein the resin comprises 16 percent styrene-ethylene-butylene styrene copolymer.

7. The coating composition of claim 4, wherein the resin comprises between 2 and 3 percent styrene.

8. The coating composition of claim 7, wherein the resin comprises 2.8 percent styrene.

9. The coating composition of claim 1, wherein the resin comprises between 15 and 20 percent styrene-ethylene-butylene styrene copolymer.

10. The coating composition of claim 9, wherein the resin comprises 16 percent styrene-ethylene-butylene styrene copolymer.

11. The coating composition of claim 1, wherein the resin comprises between 2 and 3 percent styrene.

12. The coating composition of claim 11, wherein the resin comprises 2.8 percent styrene.

13. The coating composition of claim 12, wherein the coating composition provides a gloss of at least 24 at 60° upon application to a substrate.

14. The coating composition of claim 13, wherein the coating composition provides a gloss of at least 30 at 60° upon application to a substrate.

15. The coating composition of claim 10, wherein the coating composition provides a gloss of at least 12 at 60° after 1000 hours of QUV testing.

16. The coating composition of claim 15, wherein the coating composition provides a gloss of at least 29 at 60° after 1000 hours of QUV testing.

17. A method of coating a substrate with a coating composition that may be removed by physical means only, the method comprising:
   providing a coating composition comprising: at least one hydrocarbon solvent, at least one resin, and at least one filler, wherein the filler is a silica-deficient, sodium-potassium alumina silicate and wherein the resin comprises styrene-ethylene-butylene styrene copolymer and styrene;
   applying the coating composition to a substrate; and
   allowing the coating composition to dry;
   wherein the dried coating composition may be removed from the substrate by physical means only.

18. The method of claim 17, wherein the silica-deficient, sodium-potassium alumina silicate contains less than 0.1 percent by weight crystalline silica.

19. The method of claim 18, wherein the resin comprises between 15 and 20 percent styrene-ethylene-butylene styrene copolymer.

20. The method of claim 18, wherein the resin comprises between 2 and 3 percent styrene.

* * * * *